United States Patent
Stewart et al.

(10) Patent No.: US 7,876,745 B1
(45) Date of Patent: Jan. 25, 2011

(54) TANDEM FREE OPERATION OVER PACKET NETWORKS

(75) Inventors: Mark Stewart, Harlow (GB); Graeme Gibbs, Saffron Walden (GB); Dominic Walker, Hertfordshire (GB)

(73) Assignee: Nortel Networks Limited, Mississauga Ontario (CA)

(*) Notice: Subject to any disclaimer, the term of this patent is extended or adjusted under 35 U.S.C. 154(b) by 1316 days.

(21) Appl. No.: 10/692,233

(22) Filed: Oct. 23, 2003

(51) Int. Cl.
*H04L 12/66* (2006.01)
*H04L 12/28* (2006.01)

(52) U.S. Cl. .................. 370/356; 370/401; 370/466; 455/445

(58) Field of Classification Search ......... 370/352–356, 370/252, 328, 401, 335–338, 465–468, 201, 370/286–287, 357–389, 470, 477; 455/445, 455/569, 560, 569.1–570
See application file for complete search history.

(56) References Cited

U.S. PATENT DOCUMENTS

| | | | |
|---|---|---|---|
| 7,136,375 B1* | 11/2006 | Koistinen | 370/352 |
| 7,257,114 B1* | 8/2007 | Koistinen | 370/356 |
| 2003/0193934 A1* | 10/2003 | Dropmann et al. | 370/355 |
| 2004/0004957 A1* | 1/2004 | Rabipour et al. | 370/352 |
| 2004/0076271 A1* | 4/2004 | Koistinen et al. | 379/88.11 |

* cited by examiner

*Primary Examiner*—Aung S Moe
*Assistant Examiner*—Habte Mered
(74) *Attorney, Agent, or Firm*—Barnts & Thornburg LLP

(57) ABSTRACT

A packet-based network carries a stream of voice band data, such as PCM voice data, which can include tandem free operation (TFO) information. Voice data is usually subject to processing, such as compression, at an ingress entity. The ingress entity determines whether the stream of voice data contain tandem free operation (TFO) information and, if TFO information is present, sends the TFO information across the packet network without subjecting it to processing. This preserves the integrity of the TFO information. TFO information can be carried by an unprocessed channel having a bandwidth of less than 64 kbit/s. TFO information is reinserted at an egress entity of the packet network.

24 Claims, 10 Drawing Sheets

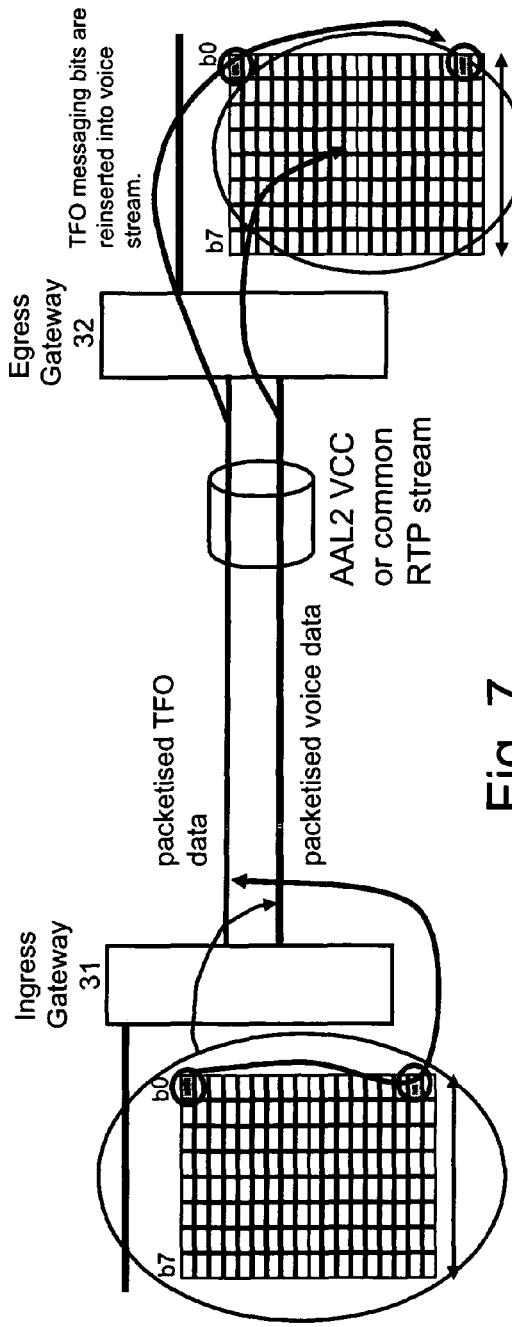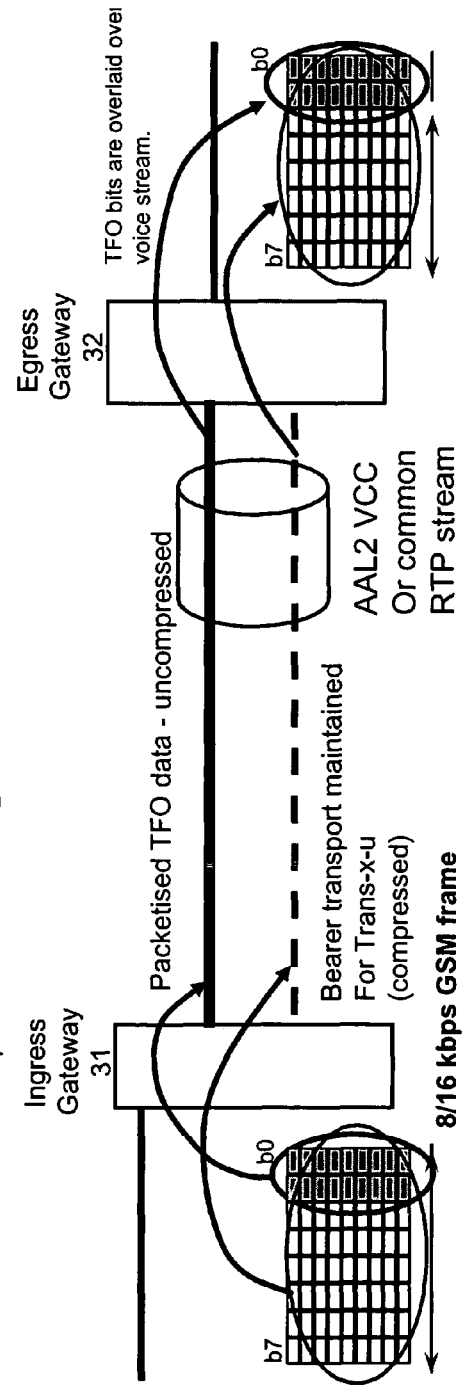

| Byte | 1 | 2 | ... | N |
|---|---|---|---|---|
| | RES=0 | Offset | Number of Bits | TFO Message Fragment | (PAD=0) |

Fig. 10A

```
 0                   1                   2                   3
 0 1 2 3 4 5 6 7 8 9 0 1 2 3 4 5 6 7 8 9 0 1 2 3 4 5 6 7 8 9 0 1
| RES=0 | Offset=0 |  No. Bits=10  |   TFO Message Fragment  | PAD=0 |
```

```
 0                   1                   2                   3
 0 1 2 3 4 5 6 7 8 9 0 1 2 3 4 5 6 7 8 9 0 1 2 3 4 5 6 7 8 9 0 1
|    0    |D=1|FO1|FO2|FO3|FO4|FO5|FO6|FO7|FO8|FO9|FO10|FO11|FO12|
|FO13|FO14|FO15|FO16|FO17|FO18|FO19|FO20|FO21|FO22|FO23|FO24|FO25|FO26|FO27|FO28|
|FO29|FO30|FO31|FO32|FO33|FO34|FO35|FO36|FO37|FO38|FO39|FO40|    PAD = 1    |
```

Fig. 10D

| 8 | 7 | 6 | 5 | 4 | 3 | 2 | 1 | |
|---|---|---|---|---|---|---|---|---|
| FO 1 | FO 2 | FO 3 | FO 4 | FO 5 | FO 6 | FO 7 | FO 8 | 1 |

8 kbit/s circuit mode data EDU format

| 8 | 7 | 6 | 5 | 4 | 3 | 2 | 1 | |
|---|---|---|---|---|---|---|---|---|
| FO 1 | | FO 2 | | FO 3 | | FO 4 | | 1 |
| FO 5 | | FO 6 | | FO 7 | | FO 8 | | 2 |

16 kbit/s circuit mode data EDU format

| 8 | 7 | 6 | 5 | 4 | 3 | 2 | 1 | |
|---|---|---|---|---|---|---|---|---|
| FO 1 | | | FO 2 | | | FO 3 | | 1 |
| | FO 4 | | | FO 5 | | | | 2 |
| FO 6 | | | FO 7 | | | FO 8 | | 3 |

24 kbit/s circuit mode data EDU format

| 8 | 7 | 6 | 5 | 4 | 3 | 2 | 1 | |
|---|---|---|---|---|---|---|---|---|
| FO 1 | | | | FO 2 | | | | 1 |
| FO 3 | | | | FO 4 | | | | 2 |
| FO 5 | | | | FO 6 | | | | 3 |
| FO 7 | | | | FO 8 | | | | 4 |

32 kbit/s circuit mode data EDU format

| 8 | 7 | 6 | 5 | 4 | 3 | 2 | 1 | |
|---|---|---|---|---|---|---|---|---|
| FO 1 | | | | | FO 2 | | | 1 |
| | | FO 3 | | | | | | 2 |
| FO 4 | | | | FO 5 | | | | 3 |
| | FO 6 | | | | | | | 4 |
| FO 7 | | | FO 8 | | | | | 5 |

40 kbit/s circuit mode data EDU format

Fig. 11C

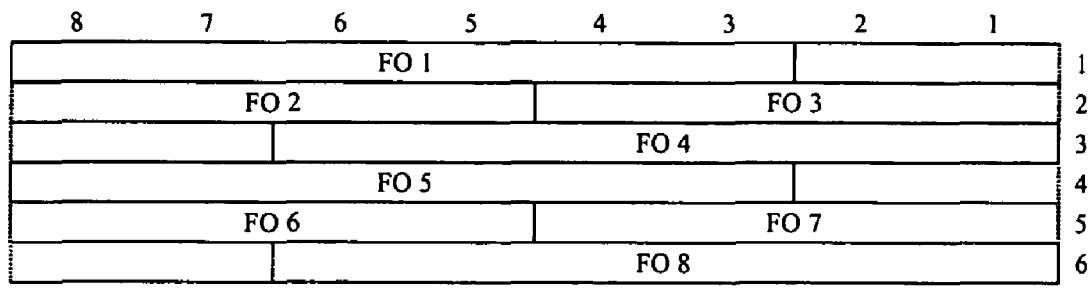
48 kbit/s circuit mode data EDU format
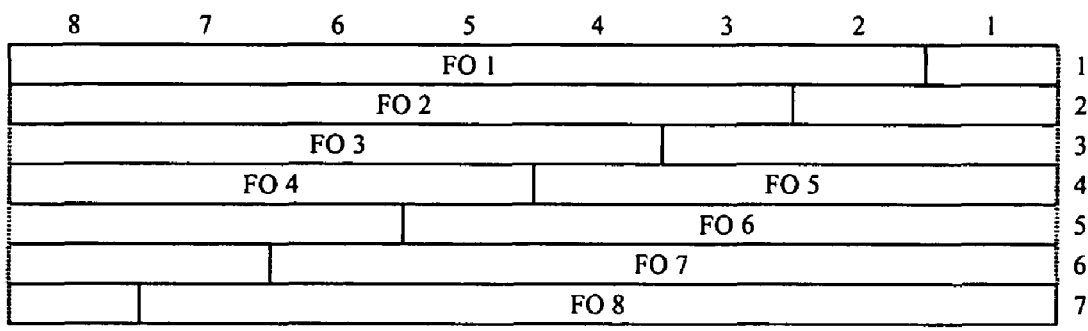
56 kbit/s circuit mode data EDU format
Fig. 11D

TANDEM FREE OPERATION OVER PACKET NETWORKS

FIELD OF THE INVENTION

This invention relates to carrying tandem free operation information over a packet data network.

BACKGROUND TO THE INVENTION

In wireless networks, such as wireless cellular networks, digitized speech is carried between a mobile and a base station in coded form to minimise the bandwidth of the transmitted signal. FIG. 1 shows a typical system with a first wireless network 10, a second wireless network 20 and a transmission network 30, such as the PSTN, which connects the wireless networks 10, 20. Considering the path of a signal originating at wireless terminal 11, speech is digitised and coded for transmission over the air interface in the first network 10. A transcoding device (transcoder and rate adaptor unit, TRAU) transcodes the voice data to a conventional PCM 64 Kbit/s format for transmission across the network 30. If, as shown in FIG. 1, the far end of the connection is another wireless network, then the PCM speech signal is again converted from PCM format to a format for transmission over the far end air interface. Each stage of transcoding degrades the quality of speech, and is particularly noticeable when the voice codecs operate at low bit rates.

Tandem Free Operation (TFO) is a known way of carrying speech data across a network where two wireless networks are connected together with a 64 kbit/s transmission path. With TFO, voice data is carried from one wireless party to another, right across any interconnecting network, in the coded form used on the air interface. As shown in FIG. 2, the transcoding stages of devices 15, 25 are bypassed. In this way, the speech is encoded at the transmitting terminal and decoded at the receiving terminal with no intermediate transcoding operations. In order to establish TFO, each wireless network will send out probing TFO in-band signalling (IS) messages to determine the presence and compatibility of the other wireless network. The TFO (IS) messages are in-band messages, embedded within the stream of PCM voice data. If compatible equipment is present, TFO is activated and the wireless networks will exchange TFO frames containing the coded speech data. TFO behaviour is defined in 3GPP TS 28.062 V5.3.0 (2002-12) for GSM/UMTS and in 3GPP2 A.S0004.B v2 (2002-08) for CDMA.

For TFO to operate, any In Path Equipment (IPE) on the 64 kbit/s circuit interconnecting the wireless networks must transparently pass the in-band TFO data. TFO IPE behaviour is defined in Annex B of 3GPP TS 28.062 V5.3.0 (2002-12). As telephony networks evolve, the IPE may comprise a packet based network, such as a network based on Internet Protocol (IP) or Asynchronous Transfer Mode (ATM) protocols. As shown in FIG. 3, a typical packet network has a gateway at each end. While these networks can be transparent to certain signals, they may not allow the TFO data to pass transparently. To understand why this can occur, TFO (IS) messages operate by 'stealing' the least significant bit (LSB) of every sixteenth PCM speech sample, while TFO frames steal the n LSBs in every sample. The packet network may itself code (compress) data as part of the packetising process. Other voice processing commonly found in packet networks includes echo cancellation, G.711 log-law coding, silence suppression and DTMF digit relay. This additional compression and processing functions can corrupt the bits representing the TFO (IS) messages.

One solution that has been proposed is for the ingress media gateway, responsible for TDM to packet conversion, to detect TFO (IS) messages or frames and to switch into a clear channel (uncompressed, 64 kbit/s) mode of operation. Operating in this manner has a number of disadvantages. Most significantly, it is wasteful of bandwidth on the packet network. The presence of TFO (IS) messages in a signal does not mean that the call will necessarily proceed to operate in TFO mode. For example, one end of the call may not be a wireless network. Switching to clear channel operation as soon as TFO (IS) messages are detected means that the clear channel transport mode is used on all calls where one end is on a TFO-enabled wireless network, even if the call can not benefit from the TFO voice quality improvement. Further disadvantages of operating in this way are that speech processing (e.g. echo cancellation, A/µ log law conversion) may be disabled, reducing voice quality, and the gateway may introduce audible defects when switching between compression codec and clear channel operation. Furthermore, those calls which do proceed to operate in TFO mode will typically only use 8 or 16 kbit/s of the 64 kbit/s channel allocated to them.

WO01/05113 describes tandem free operation in a system which includes a packet network. Information about decoding capabilities is sent from one gateway to another across the packet network. However, no information is provided as to how the gateways to the packet network can remain transparent to TFO (IS) messages.

Accordingly, the present invention seeks to improve the way in which packet networks handle TFO information.

SUMMARY OF THE INVENTION

A first aspect of the present invention provides a method of operating an ingress entity of a packet-based network, comprising:
  receiving a stream of voice data;
  passing the voice data through a processing stage;
  sending processed voice data across the packet network;
  detecting whether the received stream of voice data contains tandem free operation (TFO) information and, if TFO information is present, sending the TFO information across the packet network without passing it through the processing stage.

Sending TFO information across the packet network in an unprocessed form preserves the integrity of the TFO information. The TFO information can be reinserted into the voice data at an egress entity of the packet network, thus ensuring transparency. Meanwhile, sending voice data across the network in a processed form allows bandwidth savings to be made (if compression is used) and voice quality maintained, without a risk of corrupting TFO information. The unprocessed TFO information is effectively sent across the packet network in parallel to the processed (compressed) voice data.

Typically, the form of processing applied to voice data is some form of compression, to reduce bandwidth over the packet network, and the TFO information is not compressed in this way. The ingress may apply other forms of processing which can also have the effect of corrupting TFO information and the term 'processing' is intended to include any form of processing which could corrupt the TFO information. It will be appreciated that the TFO information will be packetized in order to be sent across the packet network. However, the TFO information is not subject to any form of processing that could potentially corrupt the information.

The term 'TFO information' includes TFO in-band signalling (IS) messages and TFO frames. TFO (IS) messages are used during a TFO messaging state. This is the initial period when network equipment (transcoding devices) in the wireless networks at each end of the call attempt to determine the TFO capabilities of each other. Once network equipment has agreed to operate in TFO mode, TFO frames are used to carry coded speech and TFO (IS) messages.

The ability to carry TFO (IS) messages and frames in an uncompressed form is important, as both are usually carried by 'stealing' bits in the PCM stream which may otherwise be subject to compression when carried over the packet network.

The term 'voice' is not limited to information representing speech, but includes any information that is carried in the voice band, such as (but not limited to) voice based data, fax, Telephony over IP.

Once the TFO information has been packetized, it can be sent at the same time, or time intervals, as the processed voice data or at different times and/or time intervals. Preferably, the packets containing TFO information include timing information derived from the same source as the packets containing voice data so that the egress can accurately reinsert the TFO data into the voice data.

Another aspect of the invention provides a method of operating an ingress entity of a packet-based network, comprising:

receiving a stream of voice data which contains tandem free operation (TFO) frames of coded voice data; and, sending the TFO frames across the packet network in an unprocessed form via a channel which has a rate of less than 64 kbit/s.

A further aspect of the invention provides a method of operating an egress entity of a packet-based network, comprising:

receiving packets containing processed voice data;

receiving packets containing unprocessed tandem free operation (TFO) information; and, reinserting the TFO information into the voice data before onward transmission.

The functionality described here can be implemented in software, hardware or a combination of these. Accordingly, further aspects of the present invention provide apparatus for performing the methods at the ingress or egress. The apparatus can be arranged to perform any of the steps of the method. Other aspects of the invention provide software for implementing the method. The software may be stored on an electronic memory device, hard disk, optical disk or other machine-readable storage medium at the ingress or egress. The software may be delivered as a computer program product on a machine-readable carrier or it may be downloaded via a network.

When operating in accordance with the invention, the ingress and egress entities of the packet network can be treated as IS_passive in path equipment (IPE), with the result that the gateways do not need to be aware of the specific type of wireless network (GSM, UMTS, CDMA) which is attempting to use TFO. This minimises the requirements on the gateway, and reduces their cost, and allows the gateway to be compatible with evolving wireless networks.

Negotiation of TFO support between the media gateways can be performed during call establishment (e.g. using SDP carried within the Gateway control protocol). Elements which are negotiated include whether the gateways are TFO capable (including the ability to buffer TFO (IS) messages in parallel to the voice stream and insert into the PCM stream), the level of dual buffering support for TFO frames, and TFO packet formats.

BRIEF DESCRIPTION OF THE DRAWINGS

Embodiments of the invention will be described with reference to the accompanying drawings in which:

FIG. 7 shows the process of extracting TFO message bits from the voice data at the ingress and reinserting them at the egress;

FIG. 9 shows the process of extracting TFO frame data from the voice data at the ingress and reinserting it at the egress;

FIGS. 10A-10D show packet formats for use with an IP packet network;

FIGS. 11C and 11D show parts of the packet used in IP and ATM packet formats.

DESCRIPTION OF PREFERRED EMBODIMENTS

Figure 3:
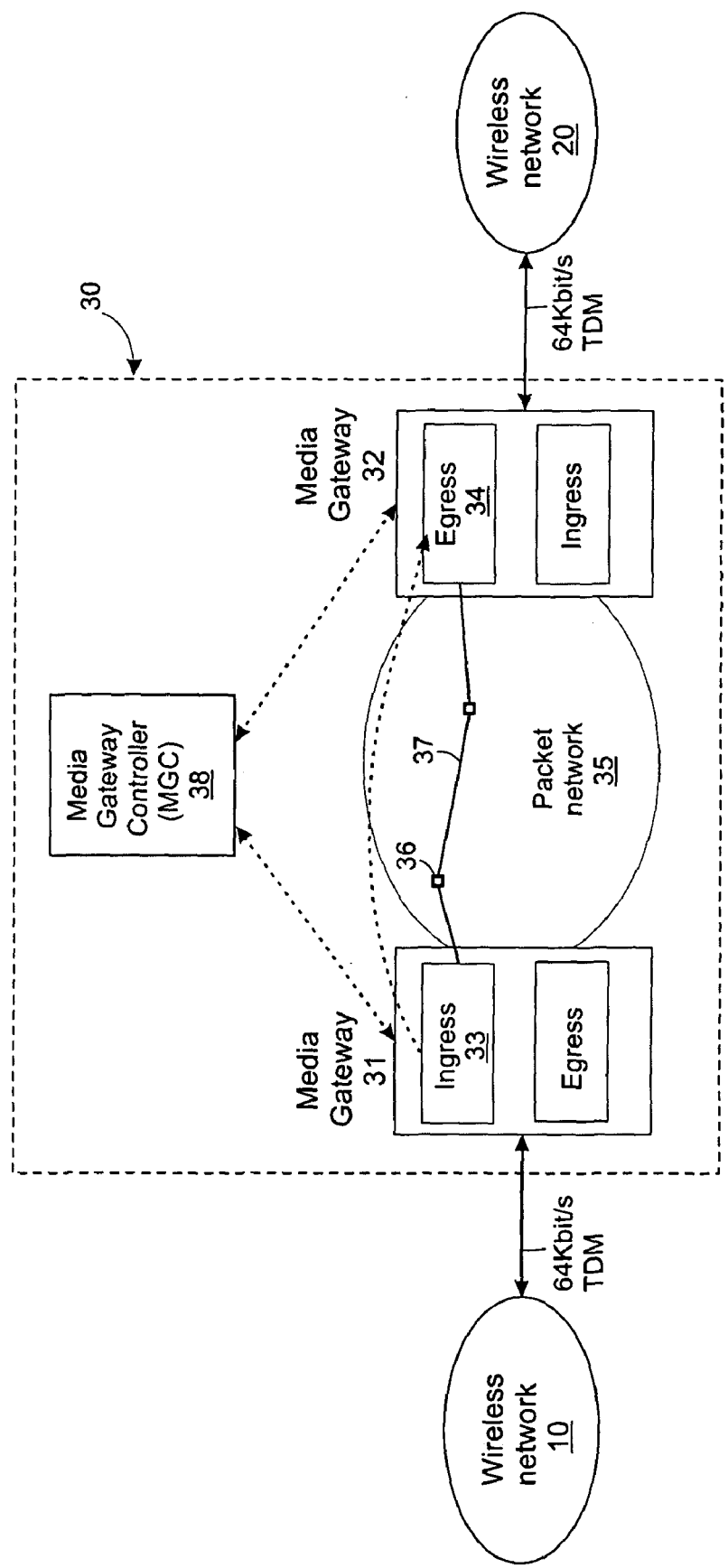
FIG. 3 shows the main parts of a packet network which can be used as the interconnecting network of FIGS. 1 and 2.

Referring again to FIG. 3, this shows an example packet network which connects a wireless network to another network, such as another wireless network. A gateway is provided at each entry/exit point of the packet network 30. Two such gateways 31, are shown although it will be appreciated that an actual network will have many such gateways. The packet network 35 itself comprises a network of routing devices 36 and, transmission links 37 which can be based on IP, ATM or other packet based protocols, as will be well understood by a skilled person.

Figure 4:
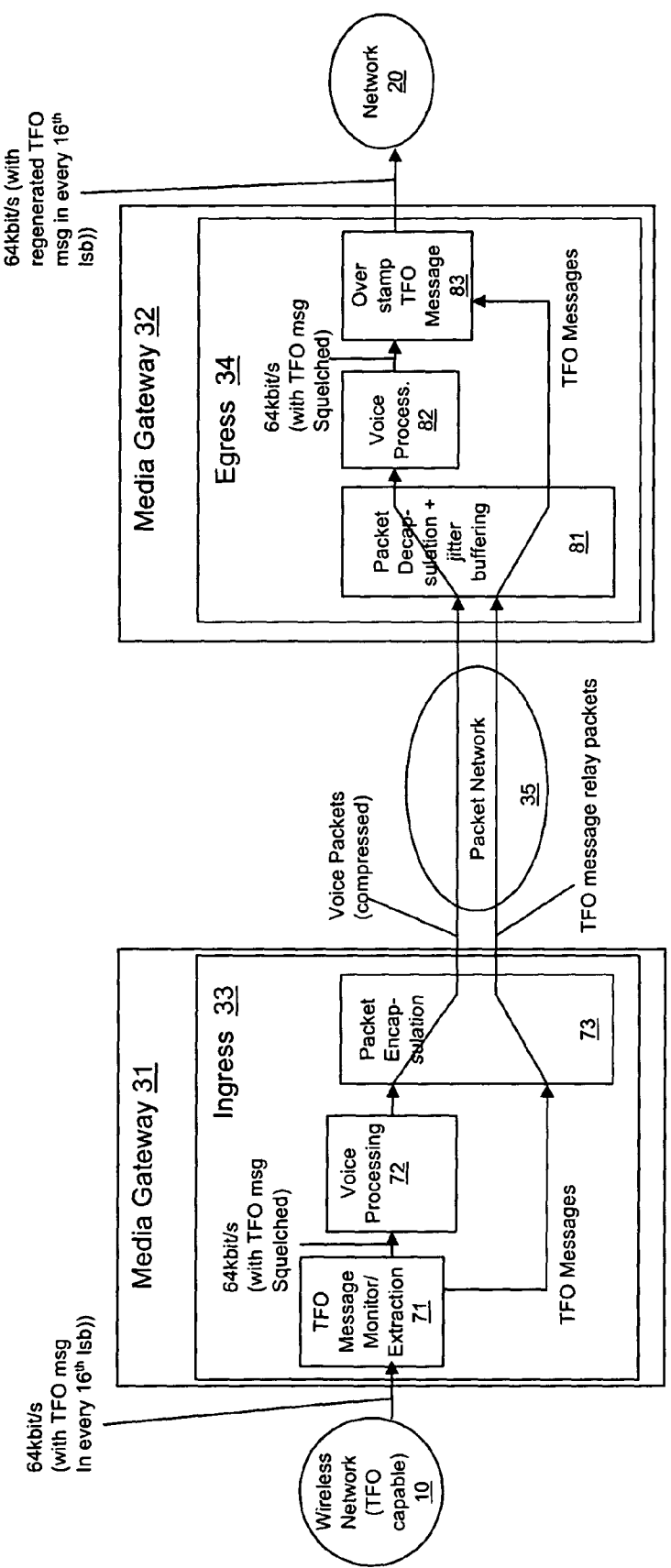
FIG. 4 shows the ingress and egress functions of gateways in the packet network of FIG. 3 when operating in a TFO message relay state.

The ingress function 33 of gateway 31 and the egress function 34 of gateway 32 are shown in FIG. 4. It will be appreciated that each gateway 31, 32 has both an ingress function and an egress function to process traffic respectively arriving and departing the packet network. For clarity, only one direction of communication is shown here.

The ingress function 33 of gateway 31 processes arriving traffic. The arriving traffic is in the form of TDM frames at a suitable multiple of 64 kbit/s. At it's lowest level, each TDM frame comprises a 64 kbit/s stream of data, arranged as 8 bit samples arriving at a rate of 8 kHz. A voice processing function codes (compresses) the voice data according to a coding algorithm, such as G.726 (adaptive differential pulse code modulation (ADPCM)) or G.729 (conjugate-structure algebraic code-excited linear-prediction (CS-ACELP)). Other forms of voice-band processing can be performed by processing function 72 in addition to, or instead of, compression. These include echo cancellation, gain adjustment and silence suppression. Processed voice data is then formed into packets by inserting portions of the voice data into payloads of packets and forming suitable header information for addressing the packets. Packets are then launched onto network 35. As will be described more fully below, the ingress of gateway 31 includes a TFO message monitoring/extraction function 71. This monitors for the presence of TFO (IS) messages carried in the least significant bits (LSBs) of PCM data. TFO data is extracted from the PCM data for forming into separate packets which can be sent over network 35. Preferably, the TFO extraction function 71 squelches the TFO data from the voice data, before the voice data is compressed, if there is a likelihood that TFO data will not be corrupted by the processing functions 72, 82 at the ingress and egress.

Gateway 32 performs an egress function 34 for traffic on the far side of the network. Packets are received and buffered 81. Data is extracted from the payloads of packets and reformatted for onward transmission. Data is decompressed by a voice processing function 82. Function 82 can also perform other processing functions, such as packet loss concealment and reinsertion of periods of silence that were suppressed at the ingress. For onward 64 Kbit/s PCM transmission, the extracted payloads are suitably buffered and reassembled into PCM format. TFO information is reinserted 83 into the PCM stream at suitable positions.

Various technologies exist for carrying PCM traffic across a packet or cell-based network and these are well documented. In the case of ATM transmission, various ATM adaptation layers (AAL), such as AAL2, define how PCM data can be carried. In the case of an IP network, PCM data can be carried by real-time protocol (RTP) packets over User Datagram Protocol (UDP).

A media gateway controller (MGC) 38 can control operation of the gateways using a number of protocols, such as H.248 and Media Gateway Control Protocol (MGCP).

Figure 5:
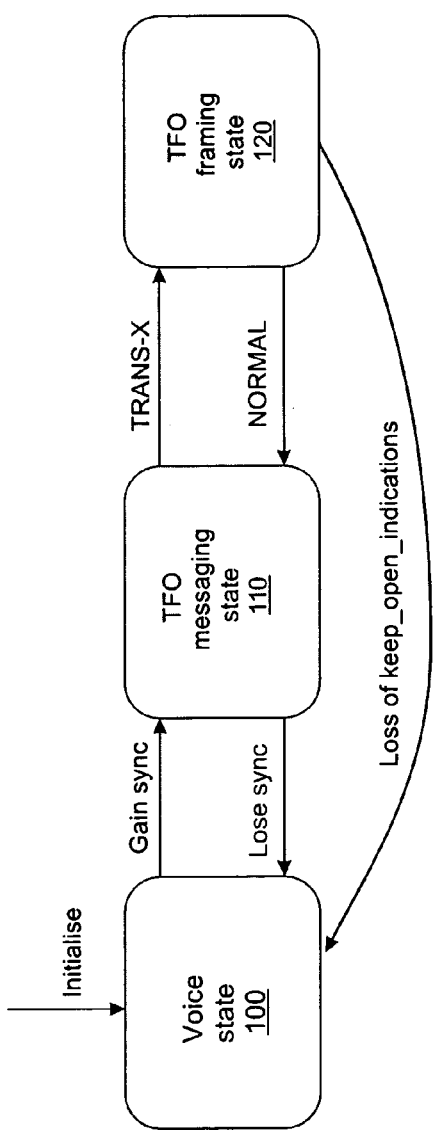
FIG. 5 shows a state diagram of operation of the ingress and egress.

FIG. 5 is a state diagram which illustrates operation of the TFO elements of the ingress 33 function of gateway 31. It will be understood that the behaviour of a pair of gateways is independent in each direction and that this state diagram represents one such direction only.

Once initialized, the gateway enters a voice state of operation 100, and receives the stream of voice data. During this state, monitor function 71 monitors for the presence of the TFO message sync pattern.

Transition to TFO Messaging State 110

Figure 6:
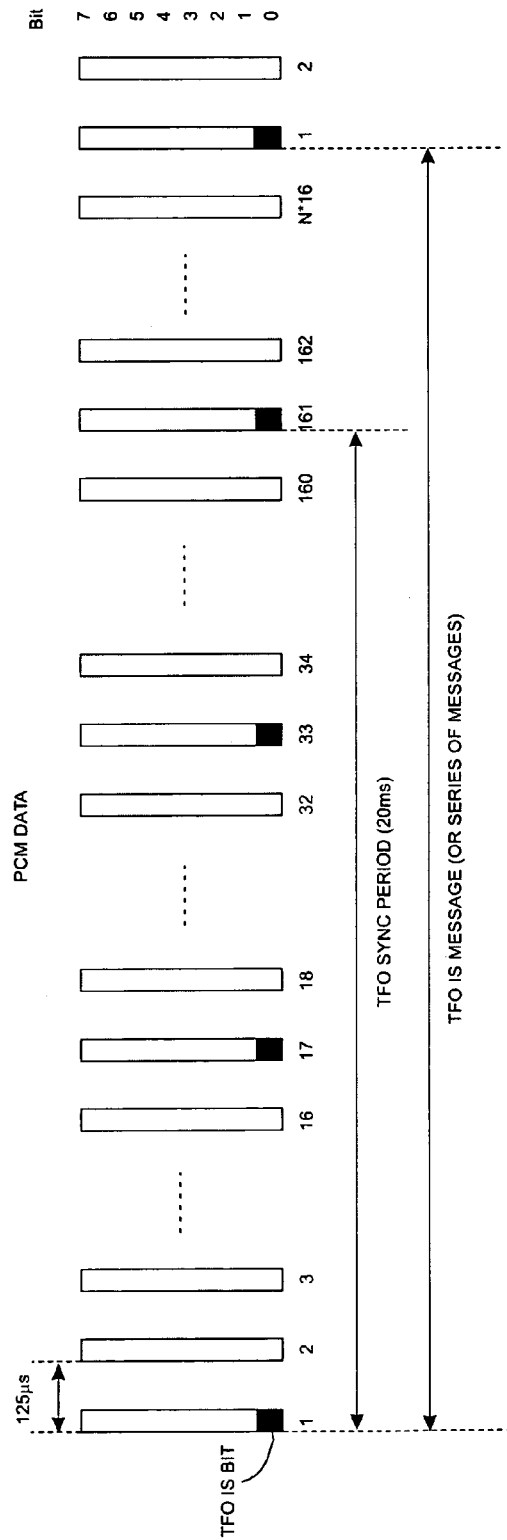
FIG. 6 shows the position of bits representing TFO in-band messages in the PCM voice data.

When the sync pattern is recognised, the ingress 33 of gateway 31 moves to the TFO messaging state 110. By way of background, TFO (IS) messages are transferred within the Least Significant Bit (LSB) of PCM samples on 64 kbit/s links, by replacing the LSB of every 16$^{th}$ consecutive PCM sample with one bit of the TFO Message. This is equivalent to an average bit rate of 10 bits per 20 ms, or 500 bits per second. FIG. 6 shows how TFO (IS) messages are embedded in the PCM stream. A vertical bar denotes an 8 bit PCM sample, the shadowed box in bit 1 (LSB) represents an inserted bit of the TFO message. All TFO (IS) messages, whatever type, have a '0' bit at every 10$^{th}$ position, starting with position 1, 11, 21 and so on. These '0'-bits occur regularly every 20 ms and can be used for synchronisation purposes. The 20 ms period will be called a TFO sync period in the following description. Annex A of 3GPP TS 28.062 V5.3.0 (2002-12) provides full details of the TFO in-band signalling protocol.

On detection of the sync pattern, the ingress 33 stores the first TFO IS Message. If a subsequent concatenated IS message is received, the ingress 33 starts transmitting TFO relay packets for the second TFO message. If it is an isolated TFO message (i.e. there is no subsequent message), the stored TFO IS message should be relayed to the egress 34. In either case, these relay packets are transmitted in parallel with the voice/VBD stream. As described more fully below, bits representing TFO (IS) messages in the arriving voice data are packetized for transmission to the far gateway 32. The first bit of the first message sent to the far gateway 32 shall be the first bit of a TFO message header. At the far gateway 32, upon detection of TFO message relay packets, the egress part of gateway 32 shall move to the TFO messaging state.

TFO Messaging State, 110

Operation of the ingress gateway 31 and egress gateway 32 during the TFO messaging state are shown in FIG. 4 and FIG. 7.

Figure 1:
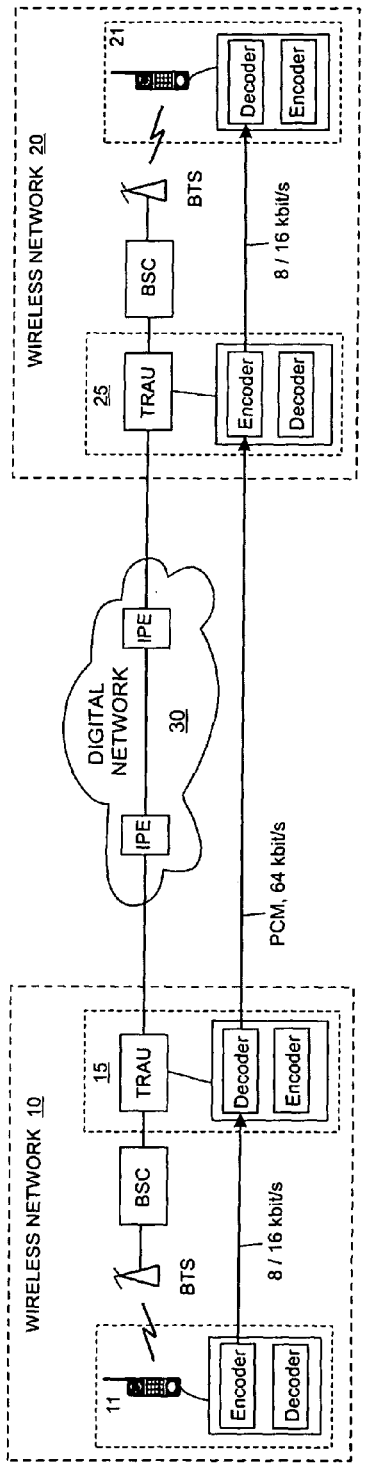
FIG. 1 shows two wireless networks interconnected by digital network in a known manner.
Figure 2:
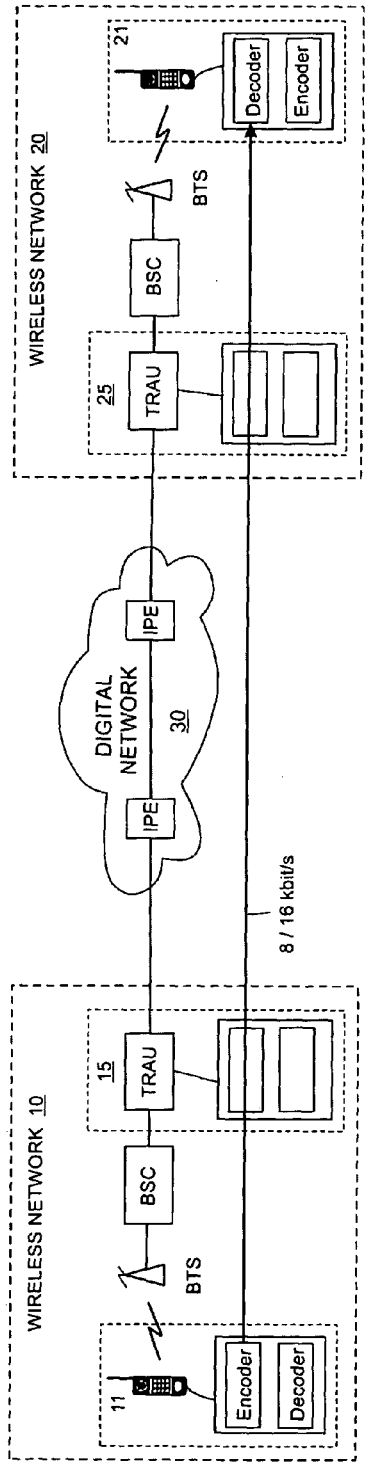
FIG. 2 shows the system of FIG. 1 in tandem free operation (TFO), in a known manner.

During the time that an ingress gateway is in TFO messaging state 110, it shall:

continue to transmit voice data in a processed (compressed) form. Typically, the same codecs and packet types will continue to be used, as were used in the state prior to transition to the TFO messaging state 110. Conversion to/from voice state during this stage will continue as normal;

squelch TFO messaging bits in the voice data to ensure that TFO messaging bits do not 'leak' through as part of the audio stream. The reason for this is that any mismatch between the existing position of the TFO message bits and the position at which TFO message bits are reinserted at the egress 34 may cause two different versions of the TFO information to exist, which could confuse downstream equipment. The TFO data can be removed by setting the LSB of the first frame of every 20 ms TFO sync period to '1' (a '0' would normally be expected);

send extracted TFO message bits as a parallel stream, in accordance with a format agreed at the start of the call. Whatever the payload format/packetization time, such messages shall be aligned to the 20 ms TFO sync period. Frame slips shall be absorbed at the ingress GW. Although the TRAU sending the TFO (IS) messages should not slip the alignment of the TFO frames, it is possible that the Wireless TRAU (15, FIG. 1) and ingress gateway 31 are not clock synchronized, such as where there is another network between the TRAU 15 and gateway 31. Therefore the ingress gateway 31 may find that the TFO frame alignment slips. The ingress gateway therefore needs to resynchronize to the new alignment.

Redundancy may be applied in accordance with transport technology (e.g. RFC2198 or AAL2 Type 3 replication). However, as TFO has its own error detection/correction and message retransmission protocols, no particular need for this is envisaged.

During the time that an egress' gateway is in the TFO messaging state 110, it shall:

decode incoming voice packets and convert these to an appropriate PCM stream as per normal voice mode, applying whatever audio decoding/audio processing techniques are required;

accept incoming TFO (IS) message packets, (discarding any redundant packets), store appropriate bits in a dejitter buffer and insert these in the LSB of the outgoing PCM stream at 2 ms intervals in accordance with Timestamp information, within the context of TFO message packets.

If, TFO relay packets are lost or arrive too late, TFO (IS) message data will be unavailable for reinsertion into the voice stream. In this event the egress gateway 32 ensures that the far end does not lose TFO sync by inserting a bit '0' into the LSB of frame 1 of the outgoing 20 ms TFO sync periods.

Where there is sufficient timestamp resolution, such as in a network based on IP, it is possible to allow TDM frame slips to propagate through the network. RTP (over IP) has a 125 μs resolution timestamp, which allows the ingress gateway to precisely indicate the timing of the TFO data relative to the voice stream, and any change in this alignment due to TDM slips (see comment above). AAL2 (I.366.2) typically uses a 1 ms resolution timestamp which is insufficient to show a single (125 μs) slip.

Transition from TFO Messaging State 110 to TFO Frame State 120

The TFO standards documents describe how a transcoding device can send an 'IS_TRANS_x' or 'IS_TRANS_x_u' message to another transcoding device. An IS_TRANS_x message is an instruction to in-path equipment (IPE) to ensure that the least significant 'x' bits of the PCM frame are carried transparently, and that the remaining bits are of no significance. An IS_TRANS_x_u message is an instruction to IPE to ensure that the least significant 'x' bits of the PCM frame are carried transparently and the upper '8-x' bits are transported as these carry uncoded voice samples. These TFO (IS) messages determine what action the gateways 31, 32 must take. When one of these messages is detected, the ingress gateway 31 moves to the TFO Frame state 120. Transition is deemed to occur on the 20 ms TFO sync period boundary immediately following the IS_TRANS message. The ingress 33 of gateway 31 shall cease transmission of TFO (IS) Message relay packets and start sending TFO Frames (described below). In implementations that use internal time ticks which are asynchronous to the TFO sync period, the ingress 33 may either insert T bits to pad out the transmitted packet to match the internal timing boundary or may remove T bits (if present) to align packet transmission correctly.

On receipt of TFO framing packets from the ingress, the egress gateway shall also move to the TFO Framing state 120. The egress GW will start playing out the TFO frame data on the 20 ms TFO sync period boundary immediately following the last played out TFO (IS) message.

Figure 8:
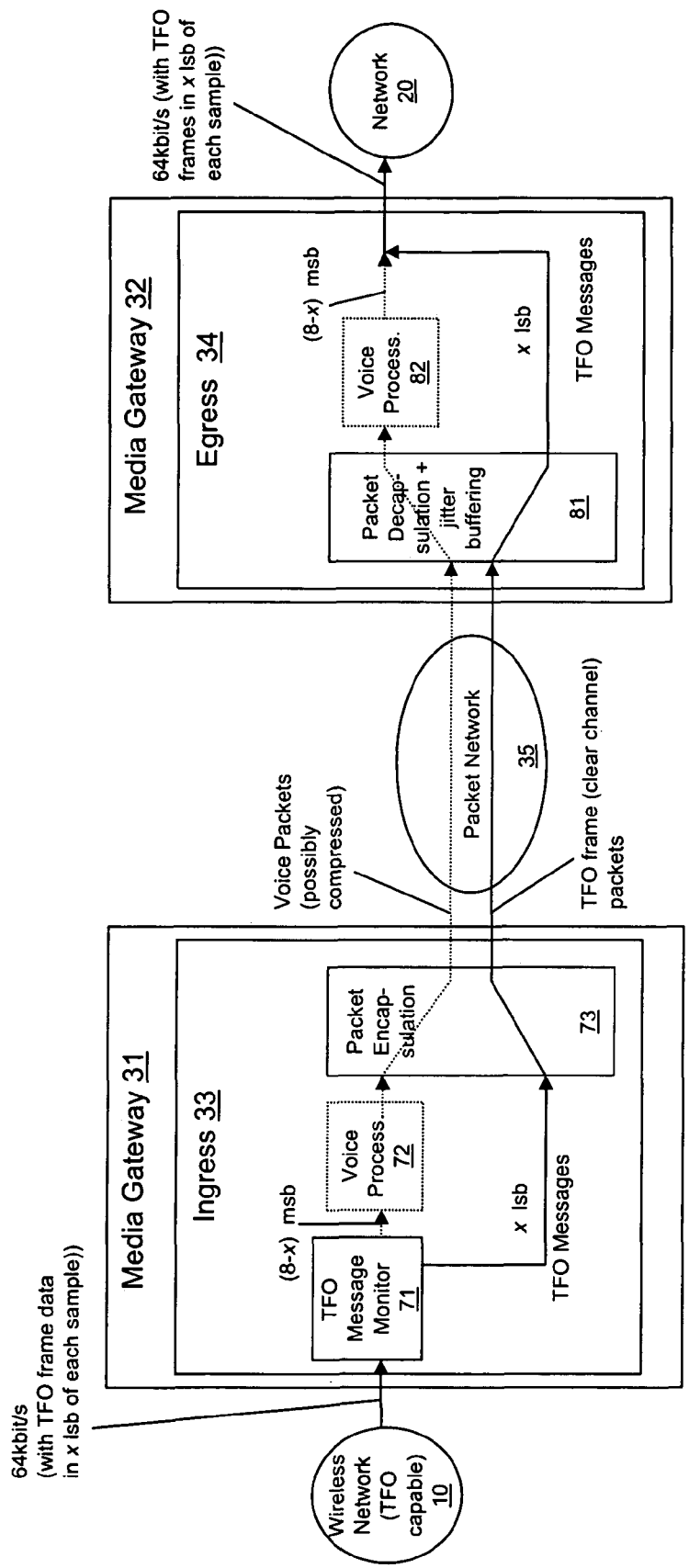
FIG. 8 shows the ingress and egress functions of gateways in the packet network during a TFO framing state.

FIGS. 8 and 9 show the operation of the ingress gateway 31 and egress gateway 32 during the TFO framing state 120.

TFO Framing State 120

When the ingress gateway 31 receives an IS_TRANS_x_u message, there are several possible ways in which the gateway can operate. The choice shall be driven by the ability of the egress gateway 32 to buffer dual streams of data (i.e. voice packets and TFO packets), together with negotiated or instantaneous bandwidth availability across the packet network 35. The process for determining the capabilities of gateways at each end of the network occurs during negotiation at the start of the call. In response to receiving an IS_TRANS_x_u message, the ingress gateway 31 may either:

continue to transmit voice or voice band data using codecs and packet types negotiated at the start of the call, and send x extracted TFO frame bits as a parallel, uncompressed (clear channel), stream in a format as agreed during negotiations at the start of the call. Whatever the payload format/packetization time, such packets shall start aligned to the 20 ms TFO sync period (or part thereof) and shall use the same timestamp sequence (or equivalent) as the voice/VBD stream. Frame slips and 'T' bits may subsequently cause the TFO frame packets to be misaligned to TFO sync periods.

or, if the far end has indicated its inability to support an appropriate level of buffering, but bandwidth parameters allow:

stop transmitting voice or voice band data using codecs and packet types negotiated at the start of the call;
send 8 extracted PCM/TFO bits as a parallel uncompressed (clear channel) stream, in a format as agreed during negotiations at the start of the call. Whatever the payload format/packetization time, such packets shall start aligned to the 20 ms TFO sync period (or part thereof) and shall use the same timestamp sequence (or equivalent) as the voice/VBD stream. This is equivalent to transparent operation.

or, if the far end has indicated its inability to support appropriate level of buffering, and bandwidth parameters do not allow transparent operation as above:

stop transmitting voice or voice band data using codecs and packet types negotiated at start of call;
send x extracted TFO frame bits as a parallel uncompressed (clear channel) stream, in a format as agreed during negotiations at the start of the call. Whatever the payload format/packetization time, such packets shall start aligned to the 20 ms TFO sync period (or part thereof) and shall use the same timestamp sequence (or equivalent) as the voice/VBD stream. The egress function of gateway 32 will play out PCM silence in the upper 8-x bits of each TDM frame. The clear channel is a fractional clear channel, i.e. it is a fraction of a full 64 kbit/s channel.

As a variation of the above, where the egress gateway 32 understands and has been monitoring the underlying IS messaging and can support the compression codec negotiated, it may choose to apply the decoded samples to the upper 8-x bits, in accordance with para B.6.4 of 3GPP TS 28.062 V5.3.0 (2002-12).

When the ingress gateway 31 receives an IS_TRANS_x TFO (IS) message (upper 8-x bits unused), the ingress function of gateway 31 shall:

stop transmitting voice or voice band data using codecs and packet types negotiated at the start of the call;
send x extracted TFO frame bits as a fractional clear channel (uncompressed) stream, in a format as agreed during negotiations at the start of the call. It is preferred that the format used to send the TFO frame bits may be a channel which occupies less than 64 kbit/s, e.g. an 8 kbit/s clear channel data channel.

Whilst in the TFO framing state 120, the ingress 33 of gateway 31 shall not transmit TFO (IS) Message relay packets across the packet network 35. However, it must continue to monitor TFO (IS) messages being received from the TDM side, while adjusting for any time alignment slips as necessary, in case an IS_NORMAL or other IS_TRANS message is received. Furthermore, the gateway 31 shall monitor for the loss of Keep_Open_Indications.

The egress gateway 32 treats the packets received during the TFO framing state 120 in a similar manner to the packets received in TFO messaging state 110, i.e. it processes the packet data representing voice codec data, TFO messaging or TFO framing. In summary:

the TFO bits representing TFO frames are reinserted into the PCM stream after any audio processing associated with the parallel codec stream;
if a TFO packet is lost, or is late in arriving at the egress function of gateway 32, this can cause TFO frame data to be unavailable at the time at which it is required. Under these circumstances, the egress function of gateway 32 shall ensure that the far end transcoding device does not lose TFO sync by inserting a binary '0' into the LSB of frame 1 in every 20 ms frame.

Packets containing TFO messaging or TFO frame data include a time stamp (or sequence number) derived from the same source as that applied to the packets containing voice data. Even where TFO packets and voice data packets are sent at times offset from one another, the use of a common source for the time stamp information ensures that the egress can accurately locate where to reinsert the TFO message bits or TFO frame data.

Transition from TFO Framing State 120 to TFO Messaging State 110

On detection of a TFO NORMAL message, the ingress gateway 31 shall revert to the TFO messaging state 110 and shall revert to transmitting TFO Messaging packets at the next 20 ms boundary.

Transition from TFO Framing to Voice/VBD, & from TFO Messaging to Voice/VBD

Upon loss of TFO Sync as per Annex B of 3GPP TS 28.062 V5.3.0 (2002-12), the ingress function of gateway 31 shall stop sending TFO messaging/framing data and start (if not already doing so) sending voice or voice band data using codecs and packet types used prior to transition. If the ingress function of gateway 31 has seen stimuli that would have precipitated a mode (e.g. VBD/ToIP etc.) change during the framing state 120 then this mode is started immediately on return to the 'voice' state 100.

Upon loss of TFO messaging/framing packets, the egress gateway 32 shall maintain downstream sync for consecutive 20 ms frames worth of TFO frames and then revert to normal audio egress behaviour.

Now that the basic operation of the packet network gateways 31, 32, has been described, two more detailed examples will be given for how existing packet protocols (IP and AAL2) can be adapted to carry TFO (IS) messages and TFO frames.

IP Embodiments

TFO data is transmitted in a real-time protocol (RTP) stream. This shares the same UDP port as the main stream of packets carrying voice data packets. It is proposed to use two dynamic payload types, one for encoding TFO (IS) messages and the other for encoding raw TFO frame data.

This section shows examples of packet formats for transporting TFO over an IP network where RTP is the primary transport protocol used. Formats are based upon data structures defined in RFC3550 (RTP), RFC3551 (RTP profile for audio and video). The conventions for numbering bits within an octet/32-bit word are as for RFC3550.

RTP Encoding format for TFO Message transport The suggested format of the RTP payload (see RFC3550 for RTP headers) is as follows:

The packet structure is shown in FIG. 10A and allows a variable number of bits from the TFO message to be sent. The Number of Bits field indicates the number of TFO message bits present in this packet. When the number of TFO message bits in the packet is not an integer multiple of eight, padding bits are used to pad the TFO message to the next byte boundary. An Offset field is used to indicate where within the TFO sync period the first bit TFO message of this packet relates to. FIG. 10B shows an example of how a 10-bit message fragment (sent ever 20 ms) is placed into a 4-byte RTP payload.

RTP Encoding Format for Fractional Circuit Mode Data

The RTP payload consists of a one octet 'depth' field immediately followed by one or more 'EDU's (see AAL2 section below and FIGS. 11C and 11D for the format of an EDU).

The depth field has the format shown in FIG. 10C, where d has a value from 0 to 7 and indicates the (number of bits—1) used per sample.

FIG. 10D shows an example 5 ms 2-bit RTP payload. FO (fractional octet) refers to the number of LSBs from the TDM stream.

For the embodiment where all 8 bits of PCM data are transmitted as clear channel, the RTP format proposed in the IETF internet draft draft-ietf-avt-rtp-clearmode-03.txt can alternatively be used.

AAL2 Embodiments

TFO Relay Messages

Various options have been considered for transport of TFO-messaging data in parallel with Voice/VBD codec:

1. Use a Type 3 packet (UUI=24). A new message type is defined (TFO_Msg). Time stamps are used to align the packets to the 20 ms TFO frames and to detect missing packets carrying the TFO data. Redundancy should not be required as error detection/correction retransmission is inherent in TFO format. TFO message packets can be sent at any interval although 10 ms or 20 ms is expected to be preferred. TFO_msg payload would carry TFO bits, an indication of number of TFO bits carried and the offset of the first bit from the start of the TFO sync period. This method is preferred, and is explained in more detail below.
2. carry as Type 1 packets. New AAL2 profiles need to be defined to include the TFO Type 1 packets. If the profile is not already running, the ingress and egress gateway will need to switch AAL2 profile. The profile change can be synchronised using methods defined in I.366.2.
2a. carry TFO messaging data in same AAL2 packet as codec, such as by carrying the TFO messaging data in some additional bytes placed after those carrying codec data. This requires a duplicate set of profiles.
2b. carry a parallel set of Type 1 packets. This again requires a duplicate set of profiles. If the size of the TFO packets conflicts with the size of the Type 1 packets carrying the voice, it will be necessary to split the UUI range (according to I.366.2) in order to discriminate between the two packet types. This would reduce the sequence range.

Figure 11A:
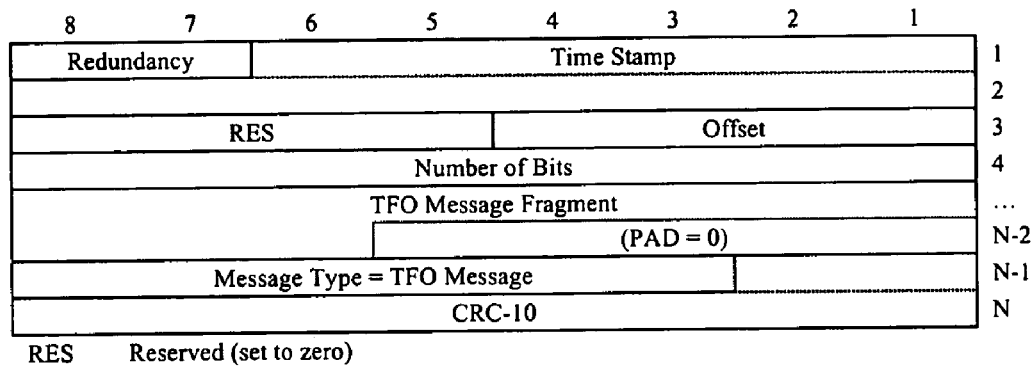
FIGS. 11A and 11B show packet formats for use with an ATM packet network.
Figure 11B:
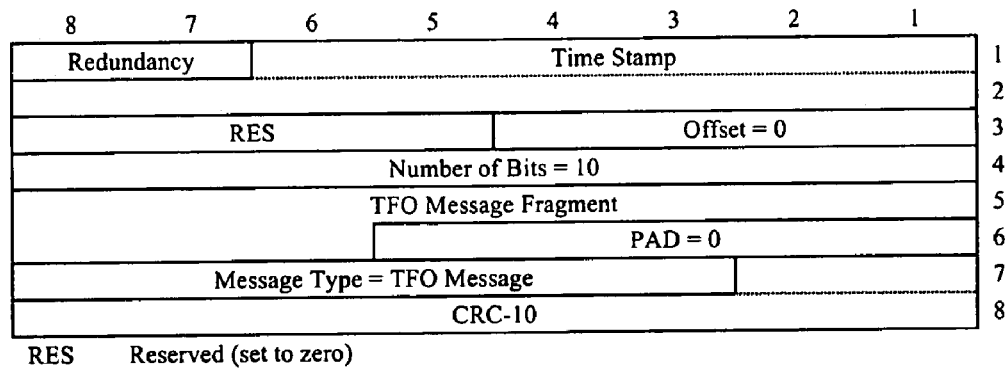

For option 1 (Type 3 packets), a proposed format is now described. This makes use of some of the common facilities for type 3 packets defined in clause 11 of I.366.2. The packet structure is shown in FIG. 11A and allows a variable number of bits from the TFO message to be sent. The Number of Bits field indicates the number of TFO message bits present in this packet. When the number of TFO message bits in the packet is not an integer multiple of eight, padding bits are used to pad the TFO message to the next byte boundary. An Offset field is used to indicate where within the TFO sync period the first bit TFO message of this packet relates to. FIG. 11B shows an example of how a 10-bit message fragment (sent every 20 ms) is placed into an AAL2 Type 3 packet.

TFO Framing Data

Various options have been considered for transport of TFO-framing data:

1) Do not try to carry TFO framing in parallel with codec. Transition directly to CCD mode user USC (ccd). For lower rate TFO where upper bits are unused, we propose an extension to CCD mode that allows CCD Type 1 packets to carry <64 kbits/s. This method is preferred and is described more fully below.
2) As per 2b of AAL2 TFO message relay formats above.
3) Using a new type 3 packet which can be sent in parallel to the voice codec.

Where TFO framing data is being relayed using a fractional 64 kbit/s type 1 packet format (option 1, above), the following format is proposed. Packets are transmitted at 5 ms intervals and the number of bits contained within each packet is determined by the packet length, using the table below. The sequence number interval is 5 ms.

| Bits per 8 kHz sample | Circuit mode bit rate (bit/s) | Packet Payload length (octets) |
|---|---|---|
| 1 | 8000 | 5 |
| 2 | 16000 | 10 |
| 3 | 24000 | 15 |
| 4 | 32000 | 20 |
| 5 | 40000 | 25 |
| 6 | 48000 | 30 |
| 7 | 56000 | 35 |

Other packetization periods are possible, in which case the payload length and sequence number interval are adjusted accordingly.

The fractional N*64 kbit/s packet is constructed by concatenating a number of the Encoding Data Units (EDUs) described below. Each EDU represents 1 ms of TDM data. Where packets are sent at 5 ms intervals, the packet will contain 5 EDUs.

The data unit format requires that fractional octet (FO) samples be accumulated over an interval of 1 ms to yield a sequence of 8 encoded values. These are concatenated in chronological order, with the earliest positioned at the most significant bit of the first octet. FIGS. 11C and 11D show various EDU formats.

Negotiation

Peer gateways 31, 32 on the packet network require some knowledge of their mutual capabilities to support TFO transparency. Ideally, this knowledge is exchanged during call set-up. Without this knowledge, a first gateway 31 may attempt to transmit packets containing TFO messaging to a non-TFO capable gateway. Generally, for H.248/MGCP terminals, negotiation takes places through the exchange of session descriptors as encoded in Session Description Protocol (SDP—RFC2327). This exchange takes place before the gateways 31, 32 know whether or not the call will use TFO.

IP Negotiation

Given the proposal
 a) to carry TFO messaging and frames in RTP packets
 b) for TFO messaging and framing payloads RTP packets use different dynamic payload types then the presence of a dynamic payload type in an audio media line indicates willingness to receive TFO message packets. Furthermore the gateway shall indicate the maximum depth (0-7) of TFO framing it is prepared to receive in parallel with audio codec.

E.g.

m=audio <udpport> RTP/AVP 0 13 18 110 111 a=ptime:20 a=rtpmap:110 TFO-MSG/8000 a=rtpmap:111 FCLEARMODE/8000 2 indicates the ability to receive TFO messaging packets on PT=110 and TFO framing packets at data rates up to 16 kbps on dynamic PT=111 in parallel with the audio stream whereas:

m=audio <udpport> RTP/AVP 0 13 18 110 111 a=ptime:20 a=rtpmap:110 TFO-MSG/8000 a=rtpmap:111 FCLEARMODE/8000 0 indicates the ability to receive TFO messaging packets on PT=110 and TFO framing packets on dynamic PT=111, but the gateway cannot accept TFO data in parallel with audio stream.

The gateway may support an alternative clear channel format to the fractional-clear-data format. For example, if the gateway supports the format proposed in the IETF internet draft draft-ietf-avt-rtp-clearmode-03.txt then the SDP might look like:

m=audio <udpport> RTP/AVP 0 13 18 110 111 a=ptime:20 a=rtpmap:110 TFO-MSG/8000 a=rtpmap:111 CLEARMODE/8000

This indicates the ability to receive TFO messaging packets on PT=110 in parallel with voice and TFO frame data is sent as 64 kbps clear data with PT=111. Voice and 64 kbps clear data are not sent in parallel.

Bandwidth parameters within the SDP shall be used to determine: (a) whether the fclearmode (fractional clear mode, rate <64 kbit/s) or clearmode packets may be sent at all and (b) whether the fclearmode packets may be sent in parallel with audio codec data.

The use of a clear channel format to which no processing is applied, having a rate of less than 64 kbit/s, has further uses, in addition to being useful for carrying TFO information.

Typically gateways (GW) are controlled by a gateway controller (GWC). Where the GWC is aware of the TFO capabilities of the gateways, the GWC should have access to information which can include:
 a) the ability of a GW to support TFO;
 b) the ability for GWC to disable TFO per-call on the GW;
 c) an event to indicate to the GWC that the GW has detected the presence of TFO messages;
 d) an event to indicate to the GWC the point at which a GW transitions to TFO messaging state, TFO framing state, voice state;
 e) the current status of GW, including TFO bit rate (x)
 f) the end-of-call status indicating TFO framing state was achieved and for what duration.

When the GWC and GW communicate to each other using H.248, this information exchange would typically be provided by a H.248 "package".

The invention is not limited to the embodiments described herein, which may be modified or varied without departing from the scope of the invention.

We claim:

1. A method of operating an ingress entity of a packet-based network, comprising:
 the ingress entity, including a processor, receiving a stream of voice data;

the processor passing the voice data through a processing stage, the processing stage including one of the group comprising applying data compression to the voice data, applying echo cancellation to the voice data, applying G.711 log-law coding to the voice data, applying silence suppression to the voice data and applying DTMF digit relay to the voice data;

the ingress entity sending processed voice data across the packet network;

a detection unit detecting whether the received stream of voice data contains tandem free operation (TFO) information and, if TFO information is present, removing TFO information from the stream of voice data before the processor passes the voice data through the processing stage, the ingress entity sending the TFO information across the packet network without passing it through the processing stage;

the method further including the detection unit controlling the step of removing TFO information from the stream of voice data to ensure that the TFO information does not leak through to voice data, wherein controlling the step of removing TFO information from the stream of voice data to ensure that the TFO information does not leak through to voice data comprises a step of squelching TFO information in the stream of voice data.

2. A method according to claim 1 further comprising inserting the TFO information into packets for sending across the packet network.

3. A method according to claim 2 wherein the TFO information is carried in the same packets as the processed voice data.

4. A method according to claim 2 wherein the TFO information is carried in separate packets from the processed voice data.

5. A method according to claim 2 wherein the TFO information comprises TFO (IS) messages and TFO frames of coded voice data and wherein a common packet format is used to carry both types of TFO information.

6. A method according to claim 5 wherein the structure of the payload differs according to whether the packet contains TFO (IS) messages or TFO frames.

7. A method according to claim 2 wherein the packet comprises an indication of the quantity of TFO information carried within the packet.

8. A method according to claim 2 wherein the packets carrying TFO information further comprise information about the time alignment of the TFO information carried in the packet.

9. A method according to claim 8 wherein the processed voice data is carried across the packet network by a sequence packets which have include timestamp information and the packets carrying the TFO information share the same timestamp information.

10. A method according to claim 2 further comprising receiving information about the format of packets to be used to carry the TFO information during a call.

11. A method according to claim 1 further comprising receiving information about the capabilities of an egress entity of the packet network.

12. A method according to claim 11 wherein the information about the capabilities of the egress entity is received during call establishment.

13. A method according to claim 11 wherein the information comprises information about the buffering capabilities of the egress entity.

14. A method according to claim 13 wherein the information comprises information about the capabilities of the egress entity to buffer TFO frames in parallel with speech data.

15. A method according to claim 2 wherein the packets carrying TFO information are sent at regular intervals.

16. A method according to claim 1 wherein the TFO information comprises TFO frames of coded voice data and the method further comprises sending the TFO frames, in unprocessed form, in a channel which occupies less than 64 kbit/s.

17. A method according to claim 1 further comprising a step of recognising the synchronisation pattern of the TFO information and, wherein, the step of controlling removing TFO information from the stream of voice data to ensure that the TFO information does not leak through to voice data comprises monitoring the frame alignment of the TFO information and performing resynchronization when the alignment of the TFO information slips.

18. Apparatus for use at an ingress of a packet-based network comprising:

an input for receiving a stream of voice data;

a processor adapted to pass for passing the voice data through a processing stage, the processing stage including one of the group comprising applying data compression to the voice data, applying echo cancellation to the voice data, applying G.711 log-law coding to the voice data, applying silence suppression to the voice data and applying DTMF digit relay to the voice data;

an output for sending processed voice data across the packet network;

a detection unit adapted to detect for detecting whether the received stream of voice data contains tandem free operation (TFO) information and, if TFO information is present and remove TFO information from the stream of voice data before the processor passes the voice data through the processing stage, the apparatus sending the TFO information across the packet network without passing it through the processing stage; and a controller for controlling removal of TFO information from the stream of voice data by the detection unit to ensure that the TFO information does not leak through to voice data wherein controlling the step of removing TFO information from the stream of voice data to ensure that the TFO information does not leak through to voice data comprises a step of squelching TFO information in the stream of voice data.

19. A telecommunications system comprising the ingress entity according to claim 18.

20. Apparatus for use at an ingress of a packet-based network comprising:

an input for receiving a stream of voice data which contains tandem free operation (TFO) frames of coded voice data;

a processor for passing the voice data through a processing stage, the processing stage including one of the group comprising applying data compression to the voice data, applying echo cancellation to the voice data applying G.711 log-law coding to the voice data, applying silence suppression to the voice data and applying DTMF digit relay to the voice data;

a first output for sending processed voice data across the packet network;

a detection unit for detecting the TFO frames and, if TFO frames are present, removing TFO frames from the stream of voice data before the processor passes the voice data through the processing stage;

a controller for controlling removal of TFO information from the stream of voice data to ensure that the TFO information does not leak through to voice data; and, a second output for sending the TFO frames across the packet network in an unprocessed form via a channel which has a rate of less than 64 kbit/s, wherein controlling the step of removing TFO information from the stream of voice data to ensure that the TFO information does not leak through to voice data comprises a step of squelching TFO information in the stream of voice data.

21. A non-transitory computer program product for implementing a method of operating an ingress entity of a packet network, wherein the ingress entity includes a processor, the computer program product comprising computer-executable instructions embodied on a machine-readable non-transitory storage medium, the computer-executable instructions causing the ingress entity to perform the steps of:

receiving a stream of voice data;

passing the voice data through a processing stage, the processing stage including one of the group comprising applying data compression to the voice data, applying echo cancellation to the voice data, applying G.711 log-law coding to the voice data, applying silence suppression to the voice data and applying DTMF digit relay to the voice data;

sending processed voice data across the packet network;

detecting whether the received stream of voice data contains tandem free operation (TFO) information and, if TFO information is present, removing TFO information from the stream of voice data before the processor passes the voice data through the processing stage, the ingress entity sending the TFO information across the packet network without passing it through the processing stage;

further including controlling the step of removing TFO information from the stream of voice data to ensure that the TFO does not leak through to voice data, wherein controlling the step of removing TFO information from the stream of voice data to ensure that the TFO information does not leak through to voice data comprises a step of squelching TFO information in the stream of voice data.

22. A non-transitory computer program product for implementing a method of operating an ingress entity of a packet network, wherein the ingress entity includes a processor, the computer program product comprising computer-executable instructions embodied on a machine-readable non-transitory storage medium carrying the computer executable instructions causing the ingress entity to perform the steps of:

receiving a stream of voice data which contains tandem free operation (TFO) frames of coded voice data;

passing the voice data through a processing stage, the processing stage including one of the group comprising applying data compression to the voice data, applying echo cancellation to the voice data, applying G.711 log-law coding to the voice data, applying silence suppression to the voice data and applying DTMF digit relay to the voice data;

sending processed voice data across the packet network;

detecting the TFO frames and, if TFO frames are present, removing TFO frames from the stream of voice data before the processor passes the voice data through the processing stage;

controlling removal of TFO information from the stream of voice data to ensure that the TFO information does not leak through to voice data; and, the ingress entity sending the TFO frames across the packet network in an unprocessed form via a channel which has a rate of less than 64 Kbit/s, wherein controlling the step of removing TFO information from the stream of voice data to ensure that the TFO information does not leak through to voice data comprises a step of squelching TFO information in the stream of voice data.

23. Apparatus for use at an ingress of a packet-based network comprising:

an input responsive to a stream of voice data;

a processor for passing the voice data through a processing stage which processes the voice data, the processing stage including one of the group comprising applying data compression to the voice data, applying echo cancellation to the voice data, applying G.711 log-law coding to the voice data, applying silence suppression to the voice data and applying DTMF digit relay to the voice data;

an output from which processed voice data is sent across the packet network;

a detection unit which is arranged to detect whether the received stream of voice data contains tandem free operation (TFO) information and wherein the detection unit is further arranged, if TFO information is present, to remove the TFO information from the stream of voice data before the processor passes the voice data through the processing stage, the ingress entity sending the TFO information across the packet network without passing it through the processing stage, removal of TFO information from the stream of voice data being controlled to ensure that the TFO information does not leak through to voice data, wherein controlling the step of removing TFO information from the stream of voice data to ensure that the TFO information does not leak through to voice data comprises a step of squelching TFO information in the stream of voice data.

24. Apparatus for use at an ingress of a packet-based network comprising:

an input responsive to a stream of voice data which contains tandem free operation (TFO) frames of coded voice data;

a processor for passing the voice data through a processing stage which processes the voice data, the processing stage including one of the group comprising applying data compression to the voice data, applying echo cancellation to the voice data, applying G.711 log-law coding to the voice data, applying silence suppression to the voice data and applying DTMF digit relay to the voice data;

a detection unit which is arranged to detect whether the received stream of voice data contains tandem free operation (TFO) information and wherein the detection unit is further arranged, if TFO information is present, to remove the TFO information from the stream of voice data before the processor passes the voice data through the processing stage, removal of TFO information from the stream of voice data being controlled to ensure that the TFO information does not leak through to voice data; and, a transmission unit which is arranged to sending the TFO frames across the packet network in an unprocessed form via a channel which has a rate of less than 64 kbit/s, wherein controlling the step of removing TFO information from the stream of voice data to ensure that the TFO information does not leak through to voice data comprises a step of squelching TFO information in the stream of voice data.

* * * * *